Figure 1:
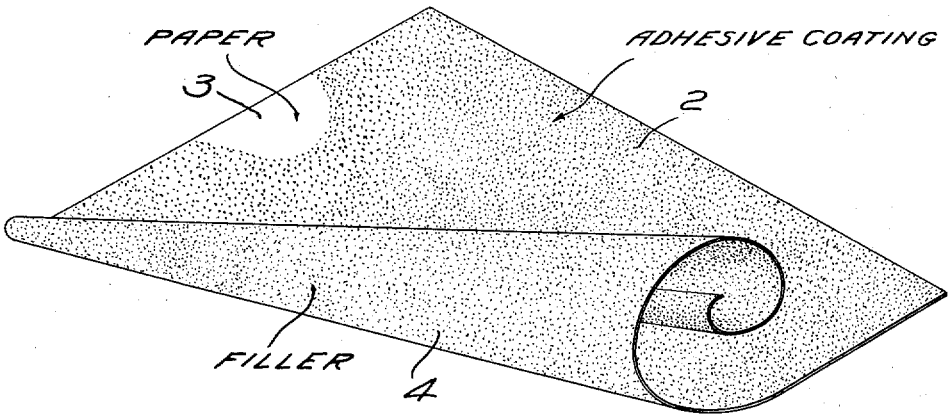

Feb. 21, 1933. F. W. FARRELL Re. 18,742

COATED PAPER

Original Filed July 17, 1925

Inventor

FREDERICK W. FARRELL,

By Paul Carpenter

Attorney

Reissued Feb. 21, 1933

Re. 18,742

UNITED STATES PATENT OFFICE

FREDERICK W. FARRELL, OF BROOKFIELD, MASSACHUSETTS, ASSIGNOR, BY MESNE ASSIGNMENTS, TO MINNESOTA MINING & MANUFACTURING COMPANY, OF ST. PAUL, MINNESOTA, A CORPORATION OF MINNESOTA

COATED PAPER

Original No. 1,683,453, dated September 4, 1928, Serial No. 44,358, filed July 17, 1925. Reissue No. 17,760, dated August 5, 1930, Serial No. 335,677, filed January 28, 1929. This application for reissue filed August 30, 1930. Serial No. 478,934.

This invention relates to coated papers, and more especially to gummed papers, cloth and other sheet materials, hereinafter referred to as "paper."

It is now a common practice to apply paint, varnish, and the like, to furniture, automobiles, and other articles, by means of a spray gun. In spraying the paint on some kinds of work, it is necessary to protect some parts of the work from the spray. This is particularly true in painting automobiles since different parts of an automobile are often painted in different colors and some parts, such as the windshield, windows and upholstery must always be protected from the paint or varnish. At present, the usual practice is to cover the parts to be protected with newspapers, or other cheap paper, and to hold the paper in place by means of surgeon's tape or ordinary gummed sealing tape. The surgeon's tape is expensive and the sealing tape can be removed after the work is finished only with considerable difficulty.

It is essential that the adhesive tape used shall have sufficient strength and adhesion to hold the covering paper from being blown off the work by the force of the blast of air which creates the spray. At the same time it is desirable that the paper be stripped off easily when the work is finished, and that any of the adhesive which is left on the work be of such a character that it can be easily removed.

The present invention aims to devise an adhesively coated paper which will be relatively inexpensive to manufacture and will be especially adapted for use under the conditions above described.

I have found that the foregoing requirements are satisfied by a paper coated with a water soluble adhesive carrying a sufficient quantity of glycerine or some other hygroscopic agent to keep the adhesive tacky under normal atmospheric conditions. The adhesive used may consist of Irish moss, gelatine glue, gum tragacanth, or the like. Because of its low price, I prefer to use Irish moss, but since the adhesive properties of this material vary considerably, I add to it a certain percentage of gelatine glue or some equivalent material which is of a more uniform character. A formula which has proved satisfactory consists of 10 parts, by weight, of Irish moss, 8 parts of gelatine glue, 125 parts of water, and 60 parts of glycerine. This formula, may, however, be varied considerably, and I have found that good results are produced by using from 8 to 15 parts of Irish moss, with gelatine glue varying from zero to 10 parts, glycerine from 45 to 75 parts and water from 125 to 275 parts. Also, other water soluble adhesives may be used in place of those mentioned.

An adhesive material made by formulæ such as those above given can be applied to the paper with the usual coating machinery. A large part of the water subsequently is driven off by drying so that the quantity of water remaining in the coated paper when it is ready for the market is approximately equal to the glycerine. In this condition the coating is tacky under normal atmospheric conditions and will remain tacky practically indefinitely.

I prefer to use a relatively strong paper, such as a kraft paper, and to coat one side of the paper with starch, casein, or some other filling material which will protect the paper from abrasion. The adhesive coating is applied to the opposite side of the paper.

Figure 2:
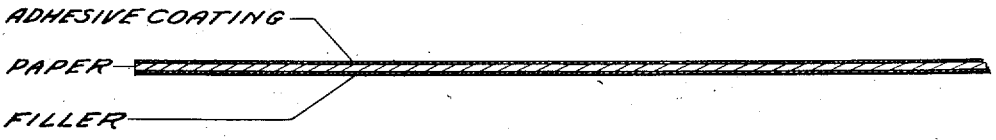

Figs. 1 and 2 of the accompanying drawing are perspective and cross-sectional views, respectively, illustrating a coated paper embodying this invention. The paper sheet is shown at 2, the adhesive coating at 3, and the filling material at 4. It will be understood that the thickness of the paper and coatings necessarily is exaggerated in Fig. 2.

In order to prevent the paper when wound in rolls or stacked in sheets from sticking together and caking, I prefer to insert a strip or sheet of glassine or other moisture resisting paper between adjacent sheets of the gummed paper.

This gummed paper is used in the usual manner either directly to cover the surface to be protected from the paint or varnish spray, or in strips to secure another protective paper to the work. The adhesive coating is usually moistened before the paper is applied to the work in order to increase the tackiness of the coating, and when the work is finished the paper can easily be stripped off due to the fact that the adhesive coating has remained tacky or sticky. The paper can then be used again either with or without additional moistening. Usually it is not necessary to moisten it for subsequent applications, but this may be necessary occasionally due to the fact that the solvent used in the paint sometimes dries out a certain amount of the water in the adhesive coating. The fact that the back of the paper, that is, the surface which is not covered with adhesive, is coated with a filler which protects the paper against roughing up when it is rubbed in being applied to the work, greatly increases the life of the paper.

While I have herein disclosed the best embodiment of my invention that I have so far devised, it will be appreciated that the invention is susceptible of embodiment in many forms without departing from the spirit of scope thereof.

Having thus described my invention, what I desire to claim as new is:

1. An article of the character described comprising paper having one side thereof coated with a filler and its opposite side coated with a water soluble adhesive which is tacky under normal atmospheric conditions.

2. An article of the character described comprising paper having one side thereof coated with an adhesive compound comprising a small percentage of a water soluble adhesive, a larger percentage of glycerine, and a proportion of water approximately equal to that of glycerine.

3. An article of the character described comprising a relatively strong sheet of paper having on one side thereof a coating to protect it against abrasion, and on its opposite side a coating of a relatively weak water soluble adhesive including a substantial percentage of glycerine.

4. An article of the character described comprising paper having one side thereof coated with a gelatinous adhesive compound comprising a small percentage of a water soluble adhesive and a larger percentage of glycerine to retain the gelatinous material tacky or sticky whereby the paper may be normally adhesively affixed in position by pressure and may be reused upon removal, and retain substantial tacky or sticky characteristics.

5. In a pressure sensitive adhesive paper, an adhesive coating which is normally tacky or sticky, comprising 8 to 25 parts of total adhesive material and 45 to 75 parts of glycerine, and water, to maintain the adhesive material and glycerine components tacky or sticky.

6. In a pressure sensitive adhesive paper, an adhesive coating comprising adhesive materials combined with water amounting to 8 to 25 parts of total adhesive material and 45 to 75 parts of glycerine and characterized by being normally tacky or sticky.

7. In a pressure sensitive adhesive paper, a normally tacky, sticky adhesive coating obtained by depositing a composition comprising water soluble adhesive materials, including Irish moss and gelatine glue from 8 to 25 parts, glycerine from 45 to 75 parts, water from 125 to 275 parts, the deposition product including substantially equal parts of water and glycerine.

8. In a pressure sensitive adhesive paper, a normally tacky, sticky adhesive coating including in the partially dried form water soluble adhesive materials 8 to 25 parts, hygroscopic material 45 to 75 parts, the water being retained in quantity to normally retain the adhesive material tacky, sticky or pressure sensitive.

9. An article of the character described comprising paper having on one side thereof an adhesive coating which is pressure sensitive, normally tacky or sticky, said coating including the deposition product of about 10 parts of Irish moss, 8 parts of gelatin glue, 125 parts of water and 60 parts of glycerine, the adhesive coating containing approximately equal parts of glycerine and water.

10. A normally removable and reusable adhesive tape comprising a paper backing having one side thereof coated with an adhesive which is tacky under normal atmospheric conditions, its opposite side coated with a protective filler.

11. A normally removable and reusable adhesive tape comprising a paper backing having one side thereof substantially uniformly coated with an adhesive including in situ a predetermined moisture content and a quantity of a moisture retaining substance for maintaining said adhesive normally tacky and pressure sensitive, the predetermined moisture content coacting with said moisture retaining substance rendering said adhesive coating in the tacky and pressure sensitive condition aforesaid.

12. A normally removable and reusable tape comprising an adhesive coating including in situ a moisture retaining substance for maintaining said adhesive normally tacky and normally pressure sensitive, a paper backing and a second coating combined with the composite formed by the adhesive coating and paper backing, said second coating serving to protect the backing material from breaking down in use, including operations due to abrasion and "roughing up", in applying the composite.

13. A normally removable and reusable adhesive tape comprising an adhesive coating including in situ a quantity of a moisture retaining substance for maintaining said adhesive normally tacky and normally pressure sensitive, a paper backing and a second coating, said second coating serving to protect one of the layers of the composite aforementioned from breaking down in operations of use of said composite, including abrasion and "roughing up" in applying the same.

14. A normally removable and reusable adhesive tape comprising a paper backing forming one layer thereof, and having on one side thereof a coating of an adhesive which is tacky under normal atmospheric conditions forming another layer, one of said layers comprising a uniformly distributed mixture of water, glue and glycerine, the opposite side of said paper being coated with a protective filler.

15. A normally removable and reusable adhesive tape comprising a paper backing forming one layer thereof, and having on one side thereof a coating of an adhesive which is tacky under normal atmospheric conditions forming another layer, one of said layers comprising a uniformly distributed mixture of water and a gelatinous material of the group comprising Irish moss, gelatin glue, gum tragacanth, together with a hygroscopic agent comprising glycerine, the opposite side of said paper being coated with a protective filler of the group consisting of starch and casein.

16. A normally removable and reusable adhesive tape comprising a paper backing forming one layer thereof, and having on one side thereof a coating of an adhesive which is tacky under normal atmospheric conditions forming another layer, one of said layers comprising a uniformly distributed mixture of water and a gelatinous material of the group consisting of Irish moss, a gelatin glue and gum tragacanth, together with a hygroscopic agent comprising glycerine, the opposite side of said paper being coated with a protective filler which protects the paper against roughing up when it is rubbed in being applied to the work.

In witness whereof I have hereunto signed my name this 27th day of August, 1930.

FREDERICK W. FARRELL.